Figure 1:
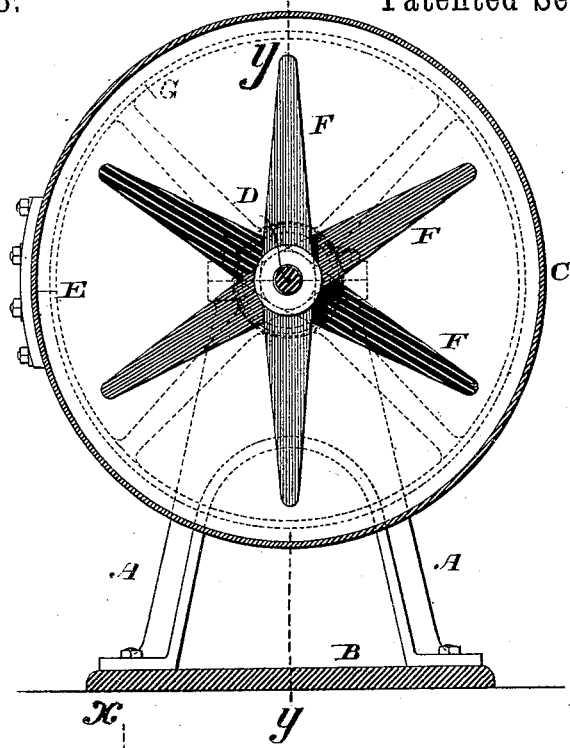

(No Model.)

J. W. HYATT.
PROCESS OF PREPARING COMPOUNDS OF NITRO CELLULOSE, &c.

No. 246,678. Patented Sept. 6, 1881.

WITNESSES.
Geo. A. Vaillant.
W<sup>m</sup> B. Roberts.

INVENTOR.
John W. Hyatt.
by Henry Baldwin Jr.
Atty

UNITED STATES PATENT OFFICE.

JOHN W. HYATT, OF NEWARK, NEW JERSEY, ASSIGNOR TO THE CELLULOID MANUFACTURING COMPANY, OF NEW YORK, N. Y.

PROCESS OF PREPARING COMPOUNDS OF NITRO-CELLULOSE, &c.

SPECIFICATION forming part of Letters Patent No. 246,678, dated September 6, 1881.

Application filed February 28, 1881. (No model.)

*To all whom it may concern:*

Be it known that I, JOHN W. HYATT, of Newark, in the county of Essex and State of New Jersey, have invented certain new and useful Improvements in the Process of Preparing Compounds of Nitro-Cellulose or Pyroxyline, and in apparatus for the conduct of such process, of which improvements the following is a specification.

My invention relates more immediately to the manufacture of plastic compositions which are susceptible of being molded in forms or shapes of the solid material, or upon forms, skeletons, or foundations of wood, metal, or other substances or compositions; but my improvements extend only to the preparation of the compounds for the subsequent treatment by which they are converted into the plastic composition. I contemplate applying my invention to various compounds that are not, strictly speaking, the basis of plastic compositions, but will proceed to describe it in connection with certain compounds of nitro-cellulose or pyroxyline, as the most comprehensive exemplification of the principles involved.

In the manufacture of compounds of nitro-cellulose or pyroxyline, vegetable fiber which has been treated with nitric and sulphuric acids, as is well understood, is mixed with solvents of such converted fiber and with pigments and with foreign matters—such as bone-dust, for example—and this mixture is subjected to a treatment by which the plastic composition is produced. Such plastic compositions are generally designated as "solid collodion."

In the manufacture of that kind of solid collodion which is characterized by the name of "celluloid," it is also well understood that the peculiarity of the process by which it is made consists in the use of solvents (of the nitro-cellulose) which are mechanically mixed with it in such a way that the action of the solvent is left dormant or restrained until the mixture is subjected to heat and pressure, the great advantage of such restraint upon the converting action of the solvent being due to the fact that an intimate mixture of the ingredients of the compound is insured before the converting action begins, so that when that action does begin it operates upon every atom of the nitro-cellulose and produces a more perfect and thorough conversion than can be obtained where active liquid solvents are applied in the old way. This process of making this kind of solid collodion is described in Letters Patent of the United States, Reissue No. 5,928, issued under date of June 23, 1874, to the Celluloid Manufacturing Company, assignee of John W. Hyatt, Jr., and Isaiah Smith Hyatt.

In the manufacture of celluloid the nitro-cellulose has heretofore been ground into a pulp in a beating-engine. The camphor (used as the latent solvent) was crushed between rolls and then mixed with the ground pulp, and this mixture was then again ground in a Bogardus mill. The pigments and the foreign matters, when any were employed, were separately prepared, but were mixed with the pulp at the same time as the camphor. To recapitulate, the process of preparing the compound consisted of the following several separate steps or stages: first, grinding the nitro-cellulose into pulp; second, comminuting the camphor; third, the preparation of the pigments and foreign matters when any were employed; fourth, the mixing together of the pulp, the camphor, and the other ingredients; fifth, the grinding together of these ingredients; and, sixth, the application of powerful pressure to the ground compound for the purpose of thoroughly compacting the ingredients and of removing the excess of aqueous moisture. At each of these separate stages there is unavoidably a greater or less accretion of extraneous matters, such as dust or dirt, grit, and the like, incident to the repeated handling of the ingredients and their exposure to the liability of such accretions.

It is the object of my improvements to simplify this preparation of these compounds; and to this end my invention consists, as to the process, in simultaneously reducing and thoroughly mixing together all of the ingredients, so that the entire operation is completed and perfected at one stage and in about the same time which was formerly required for the simple reduction of the nitro-cellulose to pulp, and it then only remains to press out the excess of aqueous moisture to bring the compound to the same condition of readines for the converting process to which it was previously brought only by the six steps or stages above enumerated; and I conduct this operation so as to prevent any accretions of dust, dirt, grit, and other impurities from the atmosphere or from the floors of the work-room.

In my improved process I take the hydrated nitro-cellulose, after the converting acids have been thoroughly washed out, and place it in a strong metal drum, which can be slowly rotated upon its axis. Into this drum I charge, with the hydrated nitro-cellulose, the proper relative quantity of camphor in lumps, or just as it is purchased in the market, and such pigments and foreign matters as are to be incorporated in the compound, just as such materials are supplied for such uses. I then close the drum securely and rotate it slowly—say ten to twenty revolutions per minute. Within the drum I provide knives or beaters, secured to a shaft passing through the drum and driven at a very high speed, so that they will act upon the respective ingredients of the charge with the required effect of reducing and intermixing them, while the slowly-rotating drum constantly throws the charge toward its center, and presents the ingredients to the reducing-edges of the knives or beaters in a constantly-changing relation. In this way I simultaneously reduce the nitro-cellulose to pulp, comminute the camphor and other ingredients, and thoroughly mix them all together in the most thorough and effectual manner, this intermixture being progressively more and more rapidly promoted, as the reduction of the ingredients progresses, until the charge is brought to the required condition, all of the ingredients being thoroughly reduced and the compound being mixed homogeneously, while by conducting the process in a closed vessel and completing it at one operation I avoid the repeated handling of the ingredients or compound, and prevent the accretion of impurities incident to such repeated manipulation and exposures.

As the nitro-cellulose when charged into the drum is comparatively very light, and the camphor and other ingredients comparatively heavy, it will be seen that it is essential to have the speed at which the knives or beaters rotate high enough to insure their proper action upon the lightest and least friable ingredients of the charge, and also to have their surfaces adapted to their proper action upon the heaviest ingredients.

For the particulars of the construction of the knives I refer to the description hereinafter given; but as to their rate of rotation I give, as the practical rule which I have adopted in use, the following, to wit: In a drum of five feet interior diameter, with knives or beaters projecting from their shaft twenty-one inches on each side, I drive the shaft carrying the knives eighteen hundred or two thousand revolutions per minute, so that the end of each blade or beater travels, say, from eighteen to twenty thousand feet per minute. The speed of rotation of the drum is, as already stated, very slow, and only requires to be such, relative to that of the knives, as will insure the turning over of the charge and its constant return from the circumference toward the center, or within the range of the knives or beaters, fast enough to maintain a constant supply for their action.

Having now described my improvement in the process of preparing these compounds, I will proceed to describe my improvements in the apparatus for the conduct of my improved process.

In the preparation of compounds of pyroxyline, such as hereinbefore referred to, the reduction of the ingredients cannot be satisfactorily effected by the ordinary operation of grinding, since the mills usually employed for such purposes soon become clogged with the camphor and other ingredients, and their reducing action is at once retarded, and very soon practically ended. In addition to this difficulty, the grinding-surfaces of these mills and the materials ground in them are so acted upon by each other that the grinding-surfaces are reduced by attrition, and there is, consequently, a considerable amount of pulverized metal thus introduced into the compound. Moreover, the beating-engine in which the nitro-cellulose was reduced has its revolving knives necessarily working past its fixed knives very closely, and these knives are acted upon by the slightest residuum of acids in the nitro-cellulose, and are more or less abraded, so that in the beating-engine, as in the grinding-mills, there is an appreciable quantity of triturated metal incorporated with the pulp, and an equally-appreciable oxidating effect, producing a discoloration which must be dissolved and washed out by a subsequent process.

It is the object of the second branch of my improvements to obviate these difficulties; and to this end my invention consists in an improved reducing and mixing apparatus in which the simultaneous reduction of the different ingredients of the compound is made practicable by due provision for the differences between the specific gravities of the ingredients and their respective conditions in other respects, and this reduction is effected without discoloring the charge, thus obviating the necessity of a subsequent treatment to remove such discoloration.

Figure 2:
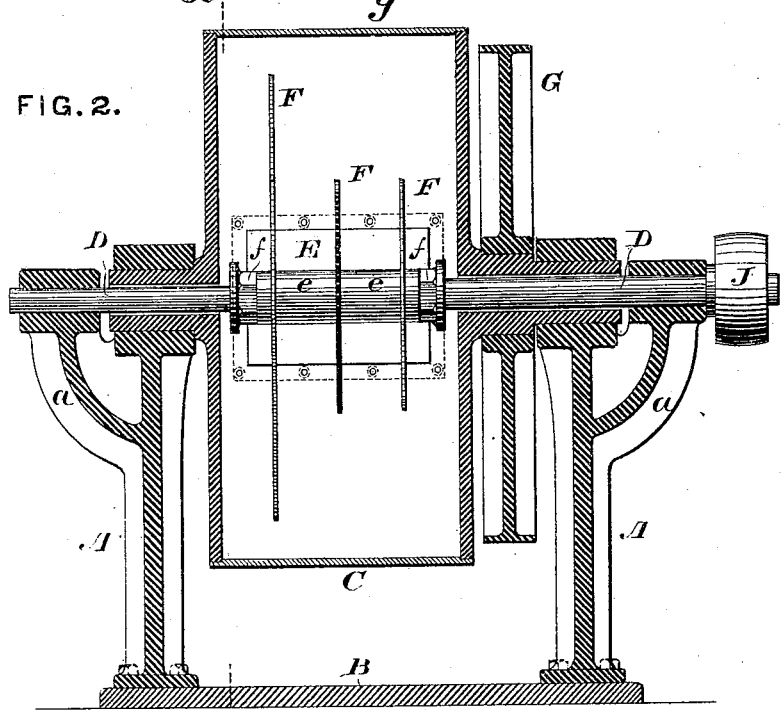

In the accompanying drawings, which form part of this specification, Figure 1 is a vertical transverse section through the apparatus on the line $x\ x$ of Fig. 2, and Fig. 2 is a vertical longitudinal section on the line $y\ y$ of Fig. 1.

Two strong uprights, A A, properly secured to the bed-plate or foundation B, afford bearings for the hollow trunnions of the drum C, which is rotated on these trunnions, as will presently be more particularly described. Bracket-arms $a\ a$, projected from the uprights, afford bearings for the shaft D, which passes through the drum and through the hollow trunnions, as seen in Fig. 2 of the drawings. On one of the projecting ends of the shaft D its driving-pulley J is mounted. The drum C is a strong hollow cylinder, of metal, of, say, five feet diameter, with a plain interior surface, and with a gate or door, E, through which the ingredients are charged or removed. This door is closed and secured in place by bolts or other suitable fastenings, and may be raised or lowered, as required, in opening or closing the cylinder, by means of a chain suspended on pulleys. The opening at each end of the drum C is re-enforced by flanges on the trunnions, which serve to attach them to the drum, strengthening the shell at that point. A driving-pulley, G, is mounted on a hub attached at one end of the drum, and serves to rotate it.

The shaft D carries the knives or beaters F F F, which are flat blades of fine steel a quarter of an inch thick, and tapering from a width of four inches near the shaft to one inch at the point, which is rounded off. These knives are fitted to the shaft in any suitable manner and at some distance apart. In the instance shown the plates or blades are swelled at the center and tapered toward each end, the center being bored out so that the blades can be slipped on the shaft into their proper positions, and projecting, in this instance, about twenty-one inches on each side of the shaft. They are placed spirally on the shaft, so that these edges and points form a series of reducing-surfaces, acting successively upon the charge at different points in the drum as the shaft rotates. They are distanced apart and kept in place longitudinally by collars $e$ $e$, interposed between two adjacent blades, and screw-nuts $f$ $f$, interposed between the outer surface of the blades and the ends of the drum, a space being left between the collars of the screw-nuts and the drum, in which I place packing for the purpose of preventing the charge from wasting or being thrown out through the annular spaces between the shaft and the hollow trunnions.

Instead of mounting the drum upon trunnions, as herein described and shown, I contemplate supporting it upon rollers placed under it, and rotating the rollers, so that they will rotate the drum at the required slow speed. I also contemplate placing on the interior of the drum cleats or other irregularities of the surface in case any of the ingredients to be reduced are of such weight or character as to make the smooth interior surface inefficient to prevent slipping.

The operation is as follows: The drum is charged with the washed nitro cellulose, the camphor, the pigments, and any other substance that is to be incorporated in the compound. The drum is then closed, the door or gate E securely fastened in place, and the charged drum slowly rotated on its trunnions, so as to constantly turn the charge over and throw it toward the shaft and within the range of the knives or beaters. The shaft D, meanwhile, is driven at a speed such as hereinbefore mentioned, so that the beaters will act constantly upon the ingredients of the charge, reducing them and mixing them thoroughly together, and when this reduction and intermixing has been effectually completed the machine is stopped and the charge removed from the drum and submitted to pressure, so as to free it from the excess of aqueous moisture, when it is ready for the first stage of the converting process. The knives or beaters act separately but in concert, and their action differs essentially from that of the moving and fixed knives of the beating-engine, or the moving and fixed teeth of the grinding-mills, hereinbefore mentioned, as in my improved apparatus there are no stationary knives or beaters or teeth against which the revolving blades act; but these blades exert their reducing-force entirely of themselves, deriving their efficiency from the high speed at which they are driven, and thereby effecting of themselves what has heretofore involved the use of opposing reducing-surfaces. By this means I avoid the clogging to which the grinding-mill is subject, and the abrasion of the teeth or knives, to which both the mill and the beating-engine are liable, as already stated, and accordingly do not encounter the oxidating or rusting effect of such accretions in the charge.

To counteract any tendency to become overheated during the operation, I maintain a circulation of water about the outer surface of the drum, upon which the water can be sprayed or sprinkled and allowed to trickle down into a receptacle placed underneath, and from which it is led off by a waste-pipe; or I may have a double shell for the drum, and a water-circulation between the two shells, as in puddling-machines. I propose having in some cases simply a trough of water placed underneath the drum, so that the lower portion of the drum, as it rotates, will be immersed in water. I also contemplate using a circulation of air for the same purpose—that is, to prevent any overheating of the apparatus.

Having thus described the nature and objects of my invention, what I claim as new, and desire to secure by Letters Patent, is—

1. The hereinbefore-described process of preparing compounds of nitro-cellulose for the converting process, by charging the ingredients together into the reducing and mixing apparatus and simultaneously reducing and mixing the charge, substantially as set forth.

2. The combination, with the drum rotating on its axis, of the independently-revolving knives or beaters within the drum, substantially as and for the purposes described.

3. The knives or beaters arranged upon the independent shaft and driven at a high velocity to reduce and mix the ingredients of the charge, in combination with the drum independently rotated at a low speed to throw the charge within the range of the knives, substantially as described.

JOHN W. HYATT.

Witnesses:
E. LUTHER HAMILTON,
FRED C. BONNY.